Feb. 12, 1935. J. E. BLACK Re. 19,455
STEAM BOILER
Original Filed April 19, 1927 2 Sheets-Sheet 1
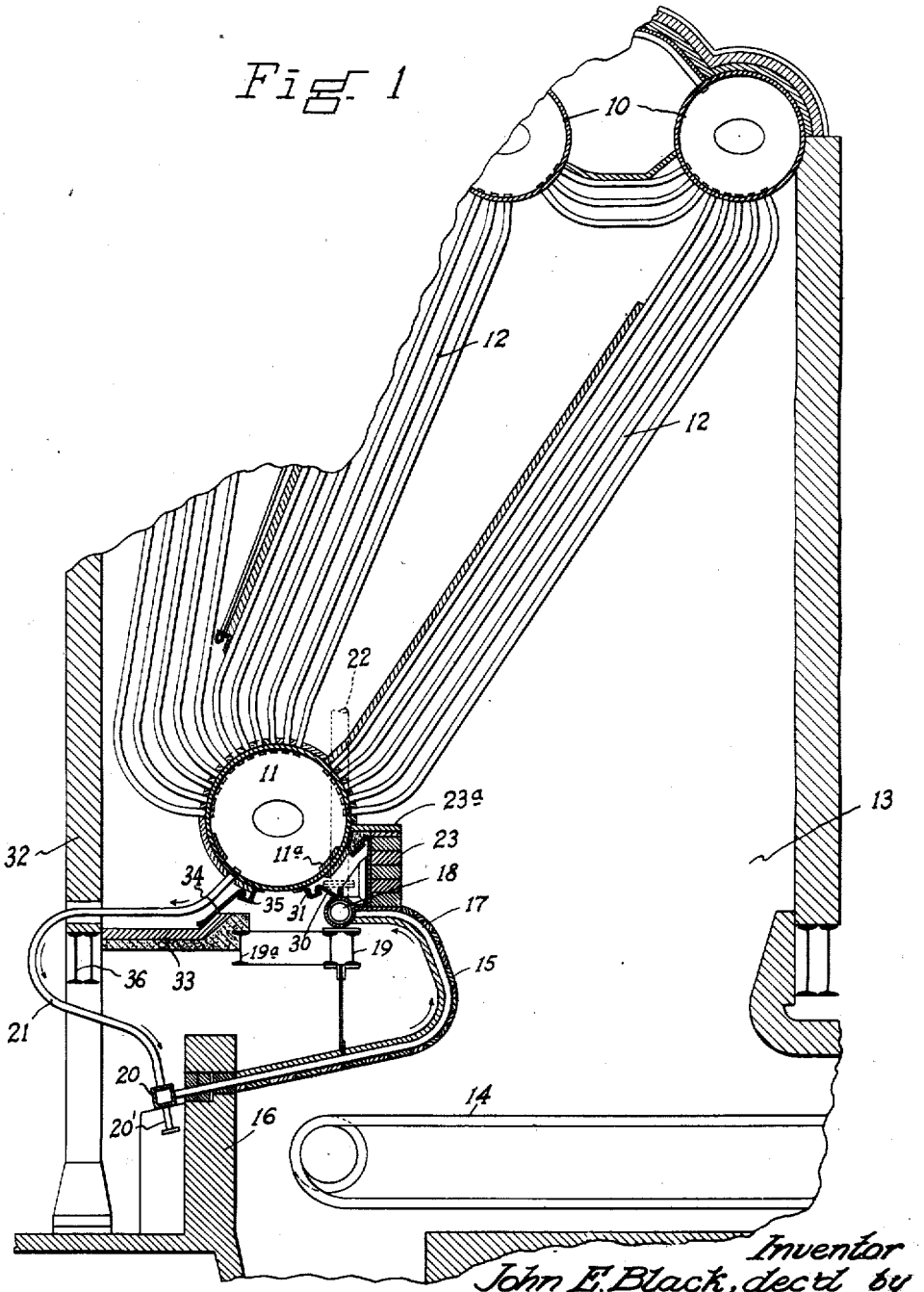
Inventor
John E. Black, dec'd by
Fuller Lehigh Company, Assignee.
BY
Guy R. Newcomb
ATTORNEY Feb. 12, 1935. J. E. BLACK Re. 19,455

STEAM BOILER

Original Filed April 19, 1927 2 Sheets-Sheet 2

Inventor
John E. Black, decd., by,
Fuller Lehigh Co. Assignee,
BY
Barr R. Newcomb
ATTORNEY Reissued Feb. 12, 1935

Re. 19,455

UNITED STATES PATENT OFFICE 19,455

STEAM BOILER

John E. Black, deceased, late of Rumsen, N. J., by Fuller Lehigh Company, mesne assignee, New York, N. Y., a corporation of Delaware Original No. 1,920,740, dated August 1, 1933, Serial No. 184,852, April 19, 1927. Renewed July 1, 1931. Application for reissue June 15, 1934, Serial No. 730,789

22 Claims. (Cl. 122—302)

Figure 4:
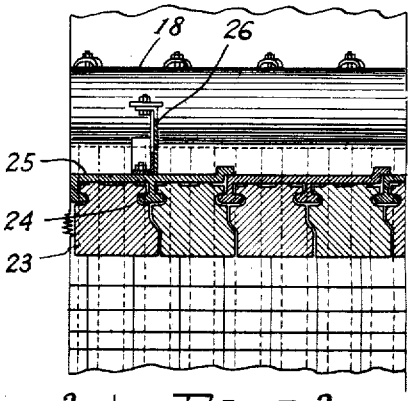
Figure 2:
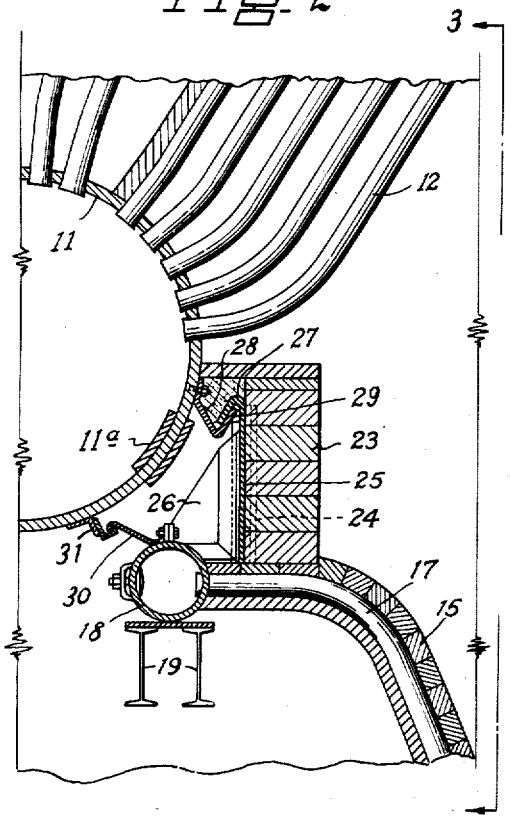
Figure 3:
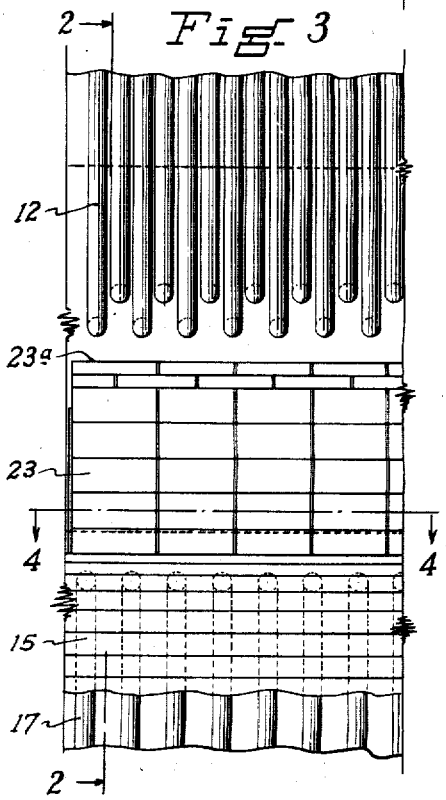

The present invention relates to steam boilers, and particularly to improvements connected with the furnaces and settings thereof, and will be best understood from the following description and the annexed drawings, in which Fig. 1 is a vertical sectional elevation, with parts broken away, of an illustrative embodiment of the invention as applied to a boiler of the Stirling type; Fig. 2 is an enlarged view of a portion of Fig. 1 and also a section on line 2—2 of Fig. 3; Fig. 3 is a view of Fig. 2 taken along the line 3—3, and Fig. 4 is a section on the line 4—4 of Fig. 3.

Like reference characters indicate like parts in the several views.

In the illustrative embodiment, a boiler of the Stirling type has upper steam and water drums 10 (two only of which are shown but of which there may be three or more) and a lower water drum 11 connected by banks of tubes 12 and provided with baffling in the usual manner to provide a series of longitudinal passes of the gases from the furnace 13 over the water tubes.

In the form illustrated, the furnace is fired by a chain grate stoker 14 in front of the front bank of tubes 12 and the drum 11. An arch 15 of any suitable refractory or the like extends from the wall 16 over the rear end of the stoker 14. This arch is water cooled by the tubes 17 which support the arch, these tubes being connected to a header 18 and suspended from I-beams 19 forming part of the boiler setting. The other ends of the tubes 17 are connected to a header or box 20 carried on the sloping face of a support 20′ on the outside of the setting wall 16, thus permitting the headers 18 and 20 to move when the tubes 17 expand and contract. The downcomer tubes 21 connect the box 20 with the drum 11 and the pipe 22 connects the header 18 with the steam space of one of the upper steam and water drums 10. By the arrangement of piping described, it will be evident that water will flow from the drum 11 through tubes 21 to the box 20 and from thence through the tubes 17, the header 18 and the pipe 22 to the upper steam and water drum, thus providing a water circulation through the cooling tubes 17. The arch carried on the tubes 17 may be formed in any desired manner, as, for instance, by means of blocks fastened to the tubes.

The header 18 is positioned adjacent to but not in contact with the drum 11, and, ordinarily, a butt strap 11ª on the drum 11 will come at a point adjacent the furnace 13. It is desirable to protect the drum 11 from the excessive effect of the radiant heat of the furnace, and this is true particularly if a butt strap is subjected to this heat.

In order to protect the drum, there is provided a short wall extending up from the arch 15 to a point in front of the water drum 11, this wall having most of its weight carried on the arch 15. The wall itself is made up of tile 23 provided with recesses, as shown best in Fig. 4, which engage bulb portions 24 of backing plates 25, these backing plates being connected to gusset plates 26 fastened to the header 18.

It will be understood that the header 18 will have a relatively fixed position because of its support on the I-beams 19 and that, on the other hand, the drum 11 will shift in its position because the boiler is suspended from the upper drums and the tubes 12 expand and contract in the operation of the boiler. For that reason, it is necessary to provide a flexible gas seal between the vertical wall and the drum 11, not only to provide for the relative movement between the drum and the arch 15 and therefore the wall 23, but also because of the vertical expansion of the backing plates 25.

To this end, there is provided a hook-like portion 27 on the upper part of the backing plates 25 with the lower face of this hook-like portion 27 extending in a direction which is substantially parallel to the direction of motion of the drum 11 when it is moved by the changing heat conditions in the boiler and its setting. This hook-like portion may also be referred to as a joint member co-operating with a complementary joint member which comprises the angularly related parts 28 and 29. On the drum 11 there is provided an angle member 28 having a hook portion 29 with its upper surface parallel to the lower surface of the hook-like portion 27. Consequently these two surfaces can be brought closely together and will permit relative motion between the wall 23 and the drum 11, it being understood, of course, that it is not essential for any purpose that the joint between these two hook portions shall be completely closed.

In practice, preferably the space is filled above the hooks 27 and 28 with a plastic heat resisting material, and cover this with a tile 23ª resting on the top of the vertical wall.

As a further seal between the drum 11 and the arch 15, there is preferably provided a flexible seal extending from the drum 11 to the header 18, this seal comprising hooked plates 30 with their hooks resting in a hook member 31 attached to the drum 11.

It will be understood that in the form of boiler illustrated, the negative pressure in the last pass adjacent the rear setting wall 32 is relatively greater as compared with the negative pressure in the furnace chamber 13 and that, if there was any direct path beneath the drum 11 from the furnace chamber 13 to this low pressure pass, hot gases would be drawn through any cracks in the seals between the arch 15 and the drum 11 and this would tend to destroy the metallic members comprising such seals. To avoid this, there is exposed a portion of the drum 11 to the atmospheric pressure of the boiler room and, in the arrangement illustrated, this is done by extending a floor 33 from the rear wall 32 to a point adjacent the lower part of the drum 11, and sealing the space between the end of this floor and the drum 11 by hooked sealing members 34 engaging hook members 35 attached to the drum 11. The inner end of the floor 33 is supported by the I-beam 19[a]. The space on the drum 11 between the members 31 and 35 is exposed to atmosphere through the openings between the I-beams 19 and 19[a]. The wall 16 terminates short of the floor 33 and the wall 32 is carried on I-beams 36 so that there is a space between the lower part of this wall and the boiler room floor. It will be understood that the tubes 21 are relatively widely spaced.

With the arrangement just described, it is evident that any leakage through the tile 23 and the metal work connected to them would be from the atmosphere inward, so that the possibility of suction drawing hot gases through this tile is obviated. In other words, by the arrangement described, the seal between the vertical wall and the drum 11 and the seal between the drum 11 and the header 18 and the floor 33 can be relatively incomplete without destroying the seals themselves. Furthermore, in the arrangement described, access to the header 18 may be readily had from the exterior of the setting for purposes of cleaning the tubes 17 and the like.

It will be understood that the arrangements which have been shown are merely illustrative and that the embodiment of the invention may be widely varied. It will also be understood that certain features of the invention may be used without other features thereof.

What is claimed is:

1. A water tube boiler of the Stirling type having an arch below and in front of the lower drum of the boiler, cooling tubes to support said arch, a wall supporting upon and extending upwardly from said arch to a point in front of said lower drum, backing plates for said wall having vertical bulb portions on the front thereof, said wall comprising tile and said bulbs engaging recesses in said tile, whereby the tile are permitted free expansion in a generally vertical direction and an angle member connected to said lower drum, said backing plates having hooks cooperating with said angle member to form a gas seal and the plates being substantially in contact with each other to form a continuous backing for the tile.

2. A water tube boiler of the Stirling type having an arch below and in front of the lower drum of the boiler, cooling tubes to support said arch, a wall supported on said arch and extending to a point in front of said lower drum, backing plates for said wall having vertical bulb portions on the front thereof, said wall comprising tile and said bulbs engaging recesses in said tile, whereby the tile are permitted free expansion in a generally vertical direction, a member connected to said lower drum and having an upper surface thereof extending substantially parallel to the motion of the lower drum produced by the expansion of the boiler water tubes connecting it with the upper boiler drums, and said backing plates having hook-like portions extending over said member with a lower surface thereof above and substantially parallel to said upper surface of said member and the plates being substantially in contact with each other to form a continuous backing for the tile.

3. A water tube boiler of the Stirling type in which the lower drum is suspended from the upper drums with a portion of said lower drum exposed to the atmosphere outside the boiler setting, an arch below said drum and in front of said drum, with one end thereof adjacent one side of said exposed portion, a floor extending from the rear setting wall to a point adjacent the other side of said exposed portion, and flexible gas seals connected to the lower drum at each side of said exposed portion and extending respectively to the adjacent end of said arch and the adjacent end of said floor.

4. A water tube boiler of the Stirling type in which the lower drum is suspended from the upper drums with a portion of said drum exposed to the atmosphere outside the boiler setting, a portion of the boiler setting forming the rear of the boiler furnace and terminating adjacent one side of said exposed portion, a second portion of the boiler setting defining a portion of the last gas pass of the boiler and terminating adjacent the other side of said exposed portion, and a flexible gas seal between the drum and the adjacent end of each of said portions of the setting.

5. A water tube boiler of the Stirling type having a wall below and in front of the lower drum of the boiler, said wall comprising cooling tubes having wall blocks carried thereby, a header to which the upper ends of said tubes are connected, a second wall extending upwardly from said first wall to a point in front of said lower drum, said second wall comprising plates forming a substantially continuous backing and having vertical bulb portions on the front thereof, tile slidably mounted on said bulbs, said tile resting upon the blocks on said tubes, and means forming a flexible gas seal between said backing plates and said drum.

6. A water tube boiler comprising a lower water chamber, a wall below and in front of said water chamber, said wall comprising cooling tubes having wall blocks carried thereby, a header to which the upper ends of said tubes are connected, a second wall extending upwardly from said first wall to a point in front of said lower water chamber, said second wall comprising plates forming a substantially continuous backing and having vertical bulb portions on the front thereof, tile slidably mounted on said bulb portion, said tile resting upon the blocks on said tubes, and means forming a flexible gas seal between said backing plates and said water chamber.

7. A water tube boiler comprising, in combination, a boiler fluid chamber, a boiler furnace, a refractory wall constituting a part of the furnace and terminating at a position adjacent the chamber, means for separately supporting the chamber and the wall, a joint member fixed relative to the wall and extending in the direction of relative movements of the wall and chamber, a joint member fixed relative to the chamber so as to have a part overlapping the first joint member and extending in a like direction, heat resisting material deposited between said joint members to fill the space therebetween during the above mentioned relative movements to constantly provide a gas seal, and a heat resisting cover positioned over said material.

8. A water tube boiler comprising, in combination, a boiler fluid chamber, a boiler furnace, a refractory wall constituting a part of the furnace and terminating at a position adjacent the chamber, means for separately supporting the chamber and the wall, a joint member fixed relative to the wall and extending in the direction of relative movements of the wall and chamber, a joint member fixed relative to the chamber so as to have a part overlapping the first joint member and extending in a like direction, and heat resisting material deposited over said joint members to constantly provide a gas seal, the members being so arranged that stresses occurring in the wall or the chamber may not be transmitted to the other of those structures.

9. A water tube boiler comprising, in combination, a boiler fluid chamber, a boiler furnace, a refractory wall constituting a part of the furnace, and terminating at a position adjacent the chamber, means for separately supporting the chamber and the wall, a joint member fixed relative to the wall and extending in the direction of relative movements, and a second joint member fixed relative to the chamber so as to have a part overlapping the first joint member, one of said joint members having two upright and horizontally spaced parts between which a part of the other joint member moves in response to the relative movements caused by expansion and contraction.

10. A water tube boiler comprising, in combination, a boiler fluid chamber, a boiler furnace, a refractory faced water wall constituting a part of the furnace and terminating at a position adjacent the chamber, a water-wall header, tubes in communication with the header and constituting a part of the wall, means for separately supporting the chamber and the wall, a joint member fixed relative to the wall and having a part extending in the direction of relative movements, and a second joint member fixed relative to the chamber so as to have a part overlapping the first joint member and extending in a like direction, one of said joint members having two spaced parts between which a part of the other joint member moves in response to the relative movements caused by expansion and contraction.

11. In a water tube steam boiler and its furnace; a water chamber constituting a part of the boiler; a furnace wall at one side of the water chamber, and an intermediate structure having upright overlapping metallic parts connecting the water chamber and said walls to constantly maintain a gas seal during boiler and furnace temperature changes; said intermediate structure including fibrous heat resisting material above the overlapping parts between which there is relative movement to compensate for said changes.

12. In a water tube steam boiler and its furnace; a water chamber constituting a part of the boiler; a furnace wall at one side of the water chamber, and an intermediate structure having upwardly extending overlapping metallic parts connecting the water chamber and said walls to constantly maintain a gas seal during boiler and furnace temperature changes; said intermediate structure including fibrous heat resisting material above said parts, and a cover plate of ceramic heat resisting material above the fibrous material; relative movements taking place between said parts to compensate for said changes in the maintenance of the gas tight enclosure.

13. In a fluid heat exchange device, a chamber containing a fluid to be heated, a furnace, a furnace wall positioned adjacent the chamber and including heat resistant tile, backing means forming tile aligners, interengaging means on the tile and the aligners for holding the tile, a furnace gas sealing means joining the aligners and the chamber, said sealing means including members movable relative to each other and having portions arranged in sealing relation to each other, whereby relative movement of said last named members is permitted without disrupting the seal.

14. In a boiler and furnace organization, a water chamber, a tile furnace wall adjacent the chamber, said wall including bulb members on which the tiles of the wall are strung, a gas seal structure joining the wall and the chamber, said seal structure including relatively movable members having portions arranged in sealing relation to each other, whereby relative movement of said last named members is permitted without disrupting the seal.

15. A water tube boiler comprising a lower water chamber, a furnace wall below and in front of said water chamber, said wall comprising cooling tubes, means on the tubes for bridging the inter-tube spaces, a header to which the upper ends of said tubes are connected, a second wall extending upwardly from said first wall to a point in front of said lower water chamber, said second wall comprising members having vertical bulb portions on the front thereof, tile slidably mounted on said bulb portions, said tile resting upon said bridging means on said tubes, and relatively movable parts forming a flexible gas seal between said members and said water chamber, said parts having portions thereof arranged in sealing relation to each other, thereby permitting relative movements between the chamber and said members without disrupting their operative relationship.

16. A water tube boiler comprising, in combination, a boiler fluid chamber, a boiler furnace, a water tube furnace wall, a refractory wall above the water tube wall and constituting a part of the furnace terminating at a position adjacent the chamber, means for separately supporting the chamber and the refractory wall so as to permit their relative movements, a gas sealing and joint structure fixed relative to the refractory wall and extending in the direction of relative movements of the chamber and the wall, a second gas sealing and joint structure fixed relative to the chamber so as to have a part overlapping the first joint structure, gas sealing means positioned between the joint structures, and means for maintaining the sealing means in position during relative movements of the joint structures.

17. In a fluid heat exchange apparatus, a furnace wall structure including water wall tubes; a boiler structure having a part adjacent the first structure and including a water chamber having fluid heat exchange tubes connected thereto; said structures having independent supports at least one of which is remote from the position at which the structures are adjacent; said two structures including adjacent and relatively movable parts, one of which is on the furnace, and the other of which is on the boiler structure, said parts arranged to form converging walls with a space between them; sealing material in said space between said relatively movable parts; and means maintaining said material in sealing relationship with said converging walls to constantly effect a gas seal between said structures during their relative movements due to expansion and contraction.

18. In a boiler and furnace organization, a row of spaced metallic members arranged along one side of the furnace, heat resisting material supported by said members and forming a furnace wall face, a fluid heat exchange device including water conducting tubes positioned above said face, a water chamber positioned near the top of said face and connected to said tubes, independent supports for the row of members and the device providing for relative movements thereof near the top of said face, and a heat resisting intermediate wall supported above the face so as to contact with said device and prevent the escape of furnace gases between the face and the device.

19. A water tube boiler having a lower drum and having a wall below and in advance of the lower drum of the boiler, cooling tubes to support said wall, a header located below said lower drum and connected to said cooling tubes, a wall extending upwardly from said first named wall to a point in front of said lower drum, and a gas seal between the drum and the second wall, said second named wall being arranged to permit relative motion between the drum and the first named wall while maintaining a gas seal between them.

20. Apparatus of the character described comprising, in combination, a water tube steam boiler having a water chamber disposed on one side of a gas pass, a water wall header adjacent the water chamber and spaced therefrom, water wall furnace tubes connected to the header and disposed in a row, heat resisting material supported by the water wall tubes to present a furnace wall, a projection extending from the furnace wall toward the water chamber, and a wall projection supported from the water chamber and having sliding engagement with the first mentioned projection to effect a furnace gas seal operative to prevent the escape of furnace gases between the water chamber and the water wall during all relative movements of those devices resulting from expansion and contraction.

21. Apparatus of the character described comprising, in combination, a fluid heat exchange device having a fluid chamber at one side of a gas pass and fluid heat exchange tubes connected thereto, a furnace wall construction including a header spaced from said chamber but disposed adjacent thereto, water wall furnace tubes connected to the header and disposed in a row, heat resisting material supported by the water wall tubes to present a furnace wall, separate structures independently supporting the fluid heat exchange device and the furnace wall so that there is relative movement between them, at least one of said structures being located at a position remote from the position of adjacency of the device and the wall, and joint constructions operatively disposed between said device and the wall and affording a gas seal therebetween, said constructions including overlapping projections one of which is fixed relative to fluid heat exchange device and the other of which is fixed relative to the furnace wall.

22. A top supported water tube boiler comprising, in combination, a fluid chamber constituting a part of the boiler and supported therefrom; a boiler furnace; a top supported refractory faced water wall constituting a part of the furnace and supported at a position adjacent the chamber, said wall including a water-wall header, and tubes in communication with the header and constituting a part of the wall; a first joint structure fixed relative to the wall and having a part extending in the direction of relative movements; and a second joint structure fixed relative to the chamber so as to have a part overlapping the first joint structure and extending in a like direction, one of said joint structures having two spaced parts between which a part of the other joint member moves in response to the relative movements caused by expansion and contraction.

FULLER LEHIGH COMPANY,
*Assignee of John E. Black, Deceased,*
By ERVIN G. BAILEY,
*President.*

CERTIFICATE OF CORRECTION.

Reissue No. 19,455. February 12, 1935.

FULLER LEHIGH COMPANY, as assignee of JOHN E. BLACK, deceased.

It is hereby certified that error appears in the printed specification of the above numbered patent requiring correction as follows: Page 2, first column, line 54, claim 1, for "supporting" read supported; and second column, line 27, claim 4, after "said" insert the word lower; and that the said Letters Patent should be read with these corrections therein that the same may conform to the record of the case in the Patent Office.

Signed and sealed this 9th day of April, A. D. 1935.

Leslie Frazer

(Seal) Acting Commissioner of Patents.